US011436372B1

(12) United States Patent
Sanchez

(10) Patent No.: US 11,436,372 B1
(45) Date of Patent: Sep. 6, 2022

(54) SYSTEMS AND METHODS FOR PROTECTING USER PRIVACY

(71) Applicant: NORTONLIFELOCK INC., Tempe, AZ (US)

(72) Inventor: Iskander Sanchez, Antibes (FR)

(73) Assignee: NortonLifeLock Inc., Tempe, AZ (US)

(*) Notice: Subject to any disclaimer, the term of this patent is extended or adjusted under 35 U.S.C. 154(b) by 0 days.

(21) Appl. No.: 17/078,871

(22) Filed: Oct. 23, 2020

(51) Int. Cl.
  *G06F 21/00*  (2013.01)
  *G06F 21/62*  (2013.01)
  *H04L 67/306* (2022.01)
  *H04L 9/40*   (2022.01)

(52) U.S. Cl.
  CPC ...... *G06F 21/6263* (2013.01); *G06F 21/6254* (2013.01); *H04L 63/0407* (2013.01); *H04L 63/168* (2013.01); *H04L 67/306* (2013.01)

(58) Field of Classification Search
  CPC ............. G06F 21/6263; G06F 21/6254; H04L 63/0407; H04L 63/1416; H04L 63/1433; H04L 63/1466; H04L 63/1483; H04L 63/1491; H04L 63/168; H04L 67/306
  See application file for complete search history.

(56) References Cited

U.S. PATENT DOCUMENTS

| | | | |
|---|---|---|---|
| 8,286,250 B1* | 10/2012 | Le | G06F 21/556 726/25 |
| 2006/0069697 A1* | 3/2006 | Shraim | H04L 63/1483 707/999.102 |
| 2011/0295988 A1* | 12/2011 | Le Jouan | G06F 21/31 709/223 |
| 2019/0243970 A1* | 8/2019 | Vinogradov | G06F 21/554 |

OTHER PUBLICATIONS

Acar, Gunes, Steven Englehardt, and Arvind Narayanan. "No boundaries: data exfiltration by third parties embedded on web pages." Proc. Priv. Enhancing Technol. Apr. 2020 (2020): 220-238, Online Publication Date: Aug. 16, 2020 (Year: 2020).*

* cited by examiner

*Primary Examiner* — Yogesh Paliwal
(74) *Attorney, Agent, or Firm* — FisherBroyles, LLP

(57) ABSTRACT

The disclosed computer-implemented method for protecting user privacy may include (i) detecting that a website indicates a user account identifier, (ii) detecting whether a third-party script has access to the user account identifier, and (iii) performing, based at least in part on detecting that the third-party script has access to the user account identifier, a security action to protect user privacy such that the security action facilitates an attempt to prevent the third-party script from actually accessing the user account identifier. Various other methods, systems, and computer-readable media are also disclosed.

20 Claims, 6 Drawing Sheets

(12) United States Patent US 11,436,372 B1

SYSTEMS AND METHODS FOR PROTECTING USER PRIVACY

BACKGROUND

Email addresses and other user account identifiers can convey many different items of information about corresponding users. They are stable over time and they may be used as a login credential for multiple services. Currently, there are many companies that track users online, and these companies use cookies and browser fingerprinting methods to do so. In many scenarios, the same companies have access to the email address, or other user account identifier, of the corresponding user. This allows these companies to merge multiple identifiers to indicate the same person across different websites and devices. This also enables the companies to infer additional personal information in relation to the user's browsing history, including inferring account ownership in online services. The present disclosure, therefore, identifies and addresses a need for improved systems and methods for protecting user privacy.

SUMMARY

As will be described in greater detail below, the present disclosure describes various systems and methods for protecting user privacy. In one example, a computer-implemented method for protecting user privacy may include (i) detecting that a website indicates a user account identifier, (ii) detecting whether a third-party script has access to the user account identifier, and (iii) performing, based at least in part on detecting that the third-party script has access to the user account identifier, a security action to protect user privacy such that the security action facilitates an attempt to prevent the third-party script from actually accessing the user account identifier.

In some examples, detecting whether the third-party script has access to the user account identifier may include an extension of a browser detecting that the third-party script has access to the user account identifier through the browser. In one embodiment, the user account identifier may include an email address and/or a social networking user account identifier.

In some examples, detecting that the website indicates the user account identifier may include detecting through a login form that the website requests the user account identifier. In some examples, detecting that the website indicates the user account identifier may include detecting that the user account identifier is embedded in text of the website after a user logon procedure has succeeded.

In some examples, detecting whether the third-party script has access to the user account identifier may include dividing the website into different contexts. In some examples, detecting whether the third-party script has access to the user account identifier may include checking whether the third-party script contains code that, when executed, reads website content.

In some examples, the computer-implemented method may further include categorizing a purpose of the third-party script. In some examples, categorizing the purpose of the third-party script may include categorizing the third-party script into at least one of the following categories: (i) scripts that create identifier cookies, (ii) scripts that generate browser fingerprints, (iii) scripts that perform click replay functions, and/or (iv) scripts that are not related to online user tracking. In one embodiment, the security action may include hiding or obfuscating the user account identifier and/or substituting the user account identifier with a privacy-masking user account identifier.

In one embodiment, a system for implementing the above-described method may include (i) a detection module, stored in memory, that detects that a website indicates a user account identifier and that detects whether a third-party script has access to the user account identifier, (ii) a performance module, stored in memory, that performs, based at least in part on detecting that the third-party script has access to the user account identifier, a security action to protect user privacy such that the security action facilitates an attempt to prevent the third-party script from actually accessing the user account identifier, and (iii) at least one physical processor configured to execute the detection module and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect that a website indicates a user account identifier, (ii) detect whether a third-party script has access to the user account identifier, and (iii) perform, based at least in part on detecting that the third-party script has access to the user account identifier, a security action to protect user privacy such that the security action facilitates an attempt to prevent the third-party script from actually accessing the user account identifier.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
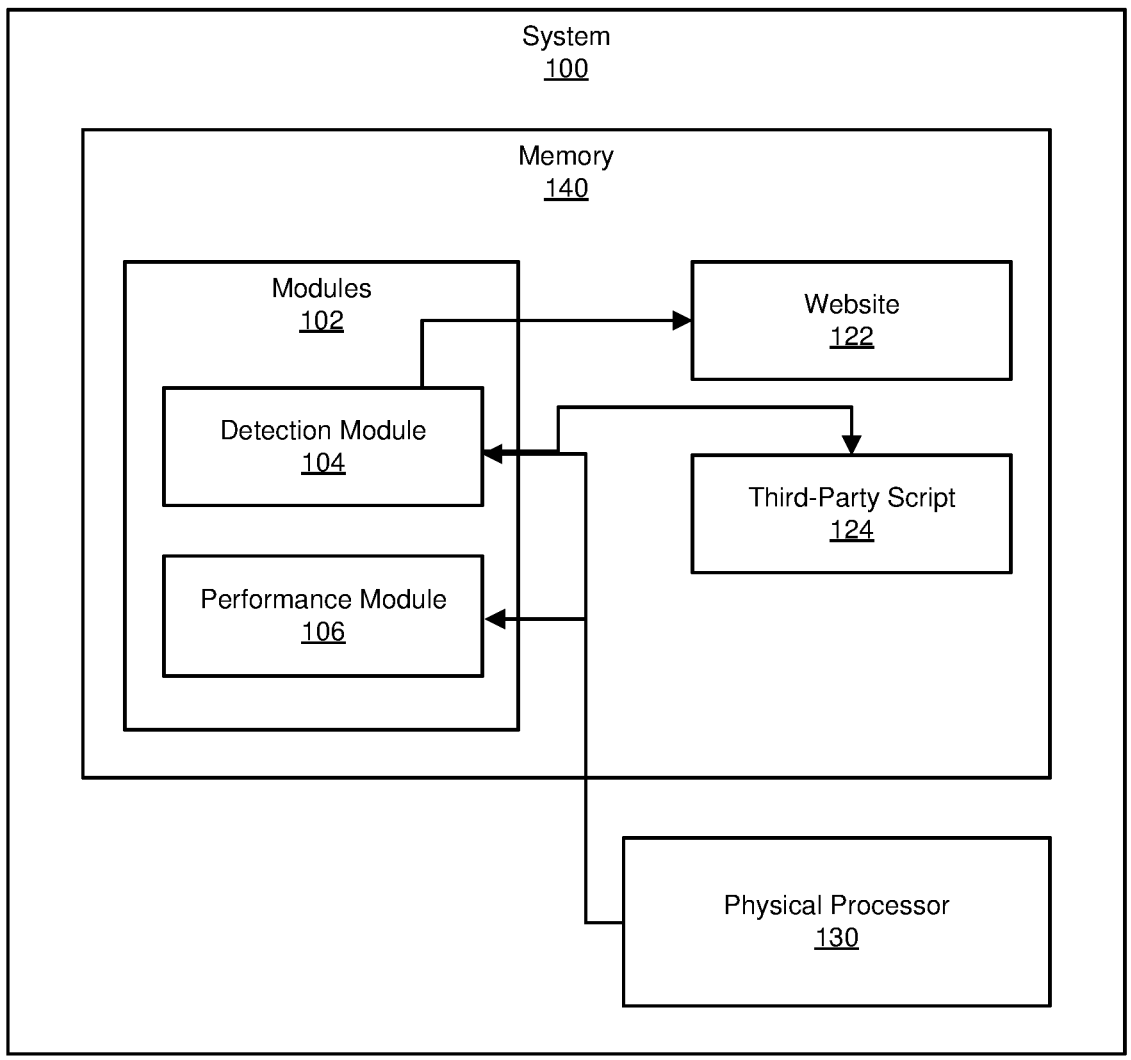
FIG. 1 is a block diagram of an example system for protecting user privacy.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for protecting user privacy. The disclosed subject matter may improve upon related technology by increasing a degree to which a user is protected from online tracking services that can merge multiple identifiers to indicate a single email or user account identifier. The disclosed subject matter may achieve this improved benefit by detecting when a website has a vulnerability that may potentially release or indicate the user account identifier, detecting whether a script can access the user account identifier, and performing a corresponding security action to protect the user from this detected vulnerability.

Figure 2:
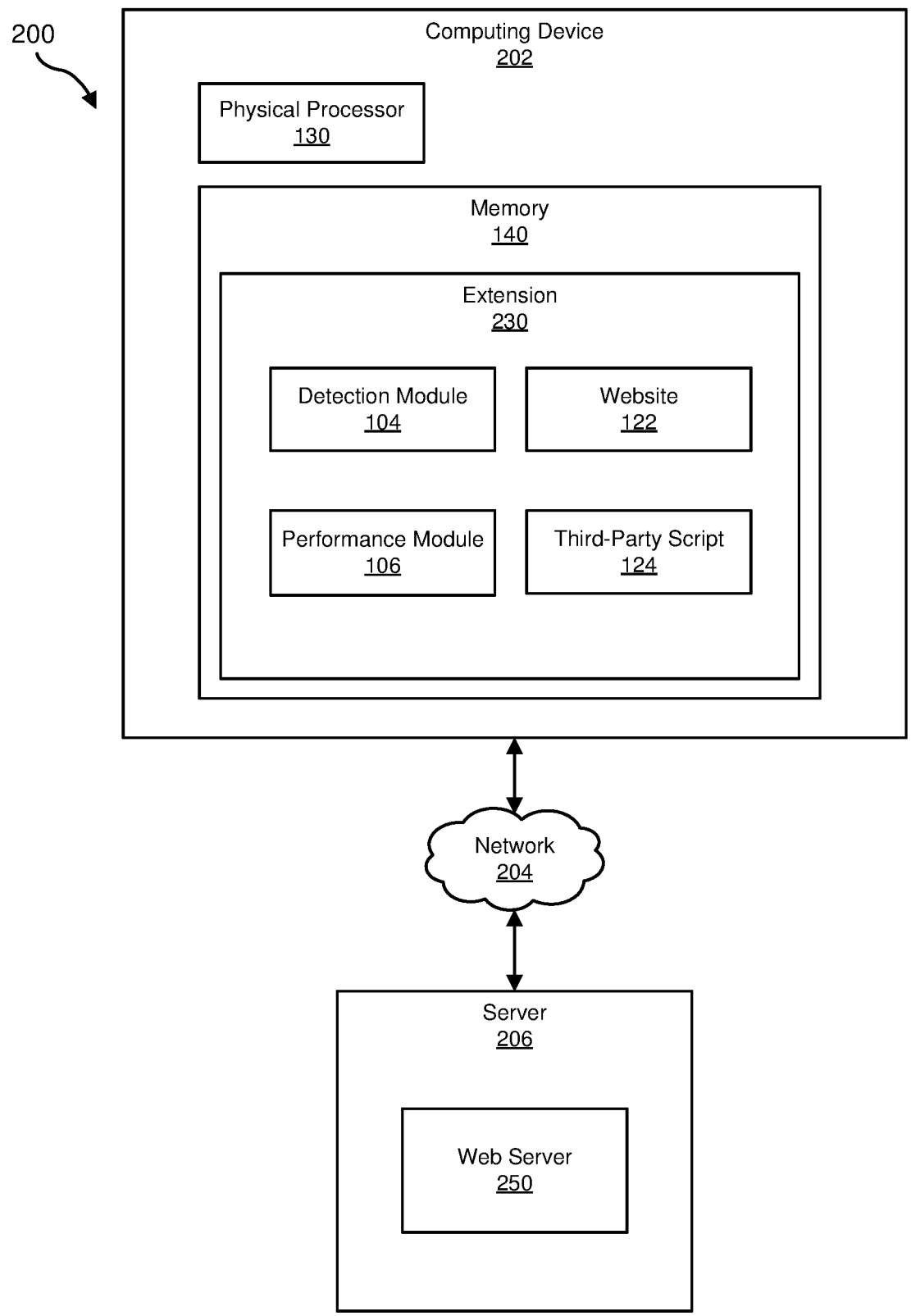
FIG. 2 is a block diagram of an additional example system for protecting user privacy.

The following will provide, with reference to FIGS. 1-2, detailed descriptions of example systems for protecting user privacy. Detailed descriptions of corresponding computer-implemented methods will also be provided in connection with FIGS. 3-4. In addition, detailed descriptions of an example computing system and network architecture capable of implementing one or more of the embodiments described herein will be provided in connection with FIGS. 5 and 6, respectively.

FIG. 1 is a block diagram of example system 100 for protecting user privacy. As illustrated in this figure, example system 100 may include one or more modules 102 for performing one or more tasks. For example, and as will be explained in greater detail below, example system 100 may include a detection module 104 that detects that a website 122 indicates a user account identifier. Detection module 104 may also detect whether a third-party script 124 has access to the user account identifier. Example system 100 may additionally include a performance module 106 that performs, based at least in part on detecting that third-party script 124 has access to the user account identifier, a security action to protect user privacy such that the security action facilitates an attempt to prevent the third-party script 124 from actually accessing the user account identifier. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting user privacy. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system.

For example, and as will be described in greater detail below, detection module 104 may detect that website 122 indicates a user account identifier. Detection module 104 may detect whether third-party script 124 has access to the user account identifier. Performance module 106 may perform, based at least in part on detecting that third-party script 124 has access to the user account identifier, a security action to protect user privacy such that the security action facilitates an attempt to prevent third-party script 124 from actually accessing the user account identifier. FIG. 2 also shows how computing device 202 may access website 122 using a browser, which may include a corresponding extension 230, accessing website content that is provided by a web server 250 located within a larger server 206.

Computing device 202 generally represents any type or form of computing device capable of reading computer-executable instructions. An illustrative example of computing device 202 may include a personal computer or smartphone. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that may facilitate the performance of method 300. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
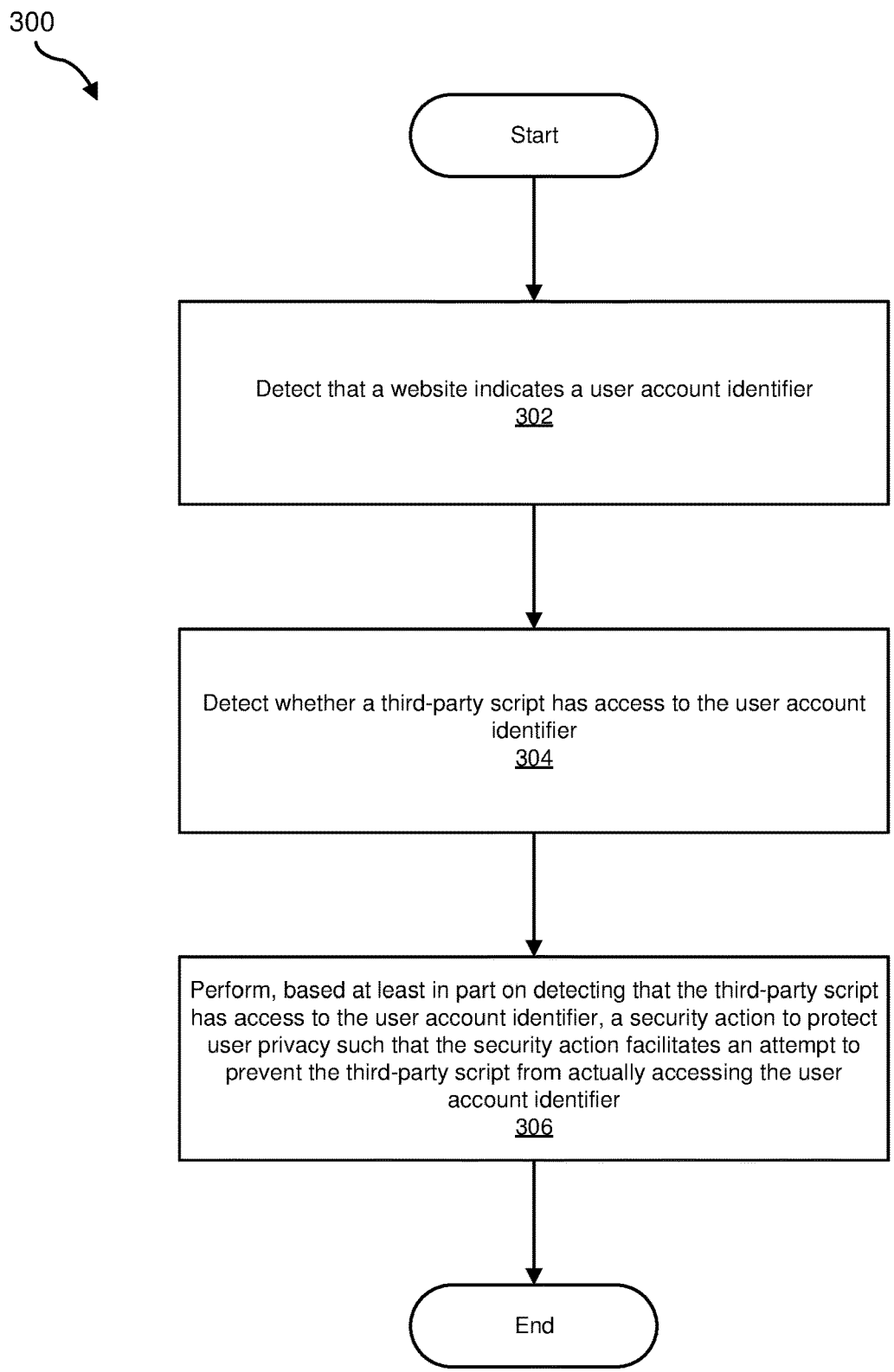
FIG. 3 is a flow diagram of an example method for protecting user privacy.

FIG. 3 is a flow diagram of an example computer-implemented method 300 for protecting user privacy. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may detect that a website indicates a user account identifier. For example, detection module 104 may, as part of computing device 202 in FIG. 2, detect that website 122 indicates a user account identifier.

As used herein, the term "user account identifier" generally refers to any identifier that distinguishes or identifies a corresponding user account. Illustrative examples of such user account identifiers may include email addresses and social networking user account identifiers. Detection module 104 may optionally include a template or pattern-recognizer that identifies whether a string of text matches a format or pattern corresponding to a user account identifier. For example, detection module 104 may identify an email address by detecting a string of characters that internally includes the "@" sign and ends with ".com" or ".edu". Similarly, detection module 104 may identify a TWITTER user account identifier by detecting a string of text that begins with the "@" sign.

As used herein, the phrase "website indicates a user account identifier" generally refers to either the website including the user account identifier within the website itself and/or the website including information that indicates a vulnerability vector for the user account identifier to be released or leaked through interactions with the website, such as content within the website that requests for the user to input an email address.

Detection module 104 may perform step 302 in a variety of ways. In some examples, detecting that the website indicates the user account identifier may include detecting through a login form that the website requests the user account identifier. For example, detection module 104 may check whether there are tags within website content, such as <input> tags within HTML content. Detection module 104 may also check whether these tags possess attributes that may indicate that an email address or user account identifier is requested to be input. These attributes may optionally include, for example, a label, a name, or placeholder data.

In further examples, detecting that the website indicates the user account identifier may include detecting that the user account identifier is embedded in text of the website after a user logon procedure has succeeded. For example, detection module 104 may control whether the user account identifier is included within code of the website using DOM mutation observers in web content tags, which may include <dd> and <span>.

Additionally, in an embodiment where detection module 104 is implemented within an extension, such as extension 230, and this extension corresponds to a password manager, then detection module 104 may directly check whether any one or more of the email addresses found in the password manager are actually being displayed within the website. Alternatively, if detection module 104 is implemented within a standalone privacy-protecting extension (i.e., a privacy-protecting extension that is directed to performing method 300 rather than functioning as a password manager), detection module 104 may detect login attempts. In these examples, detection module 104 may further store internally email addresses that are inputted as part of the login attempts. Detection module 104 may store addresses for later use as part of step 304, as discussed further below.

Figure 4:
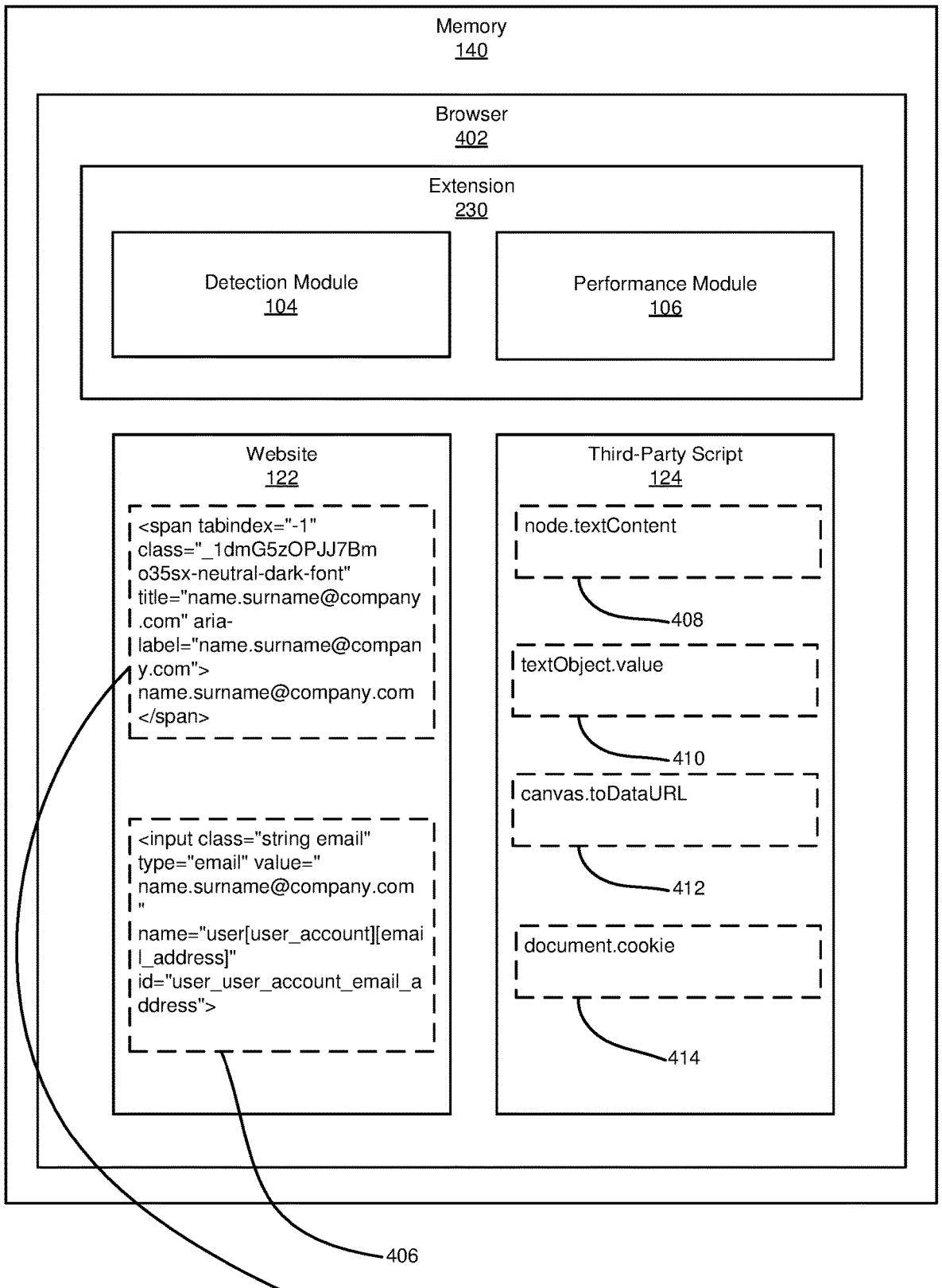
FIG. 4 is a diagram corresponding to the example method for protecting user privacy.

FIG. 4 shows an illustrative example of extension 230 located within a browser 402. FIG. 4 may expand upon a portion of system 200 shown in FIG. 2 in order to demonstrate, in more detail, one or more concrete embodiments of how method 300 may be performed. As further shown in this figure, website 122 may include a code item 404 and a code item 406, which may both correspond to items of HTML or other code for content of website 122. This figure also demonstrates how code item 404 and code item 406 both indicate a corresponding user account identifier, and in particular indicate that website 122 may reveal an email address to third-party script 124, thereby compromising a corresponding user's privacy. For example, code item 404 includes the string "name.surname@company.com" and this string matches a template or format for an email address, as further discussed above. Code item 404 actually includes multiple instances of this string. Similarly, code item 406 includes the terms "string email" and "email" and both of these terms indicate that website 122 may potentially reveal the corresponding email address of the user. Additionally, code item 404 includes another instance of the string "name.surname@company.com" that is further included within code item 404 and discussed above. Furthermore, code item 406 also includes the terms "user_account", "email_address", and "user_user_account_email_address," all of which indicate that website 122 may potentially reveal the corresponding email address to third-party script 124, and in particular the keyword "input" and the surrounding context indicates that code item 406 may correspond to a login procedure that requests for a user to enter a corresponding email address.

At step 304, one or more of the systems described herein may detect whether a third-party script has access to the user account identifier. For example, detection module 104 may, as part of computing device 202 in FIG. 2, detect whether third-party script 124 has access to the user account identifier. As used herein, the term "third-party script" generally refers to a script, such as a JavaScript component executing within a browser, that is distinct and independent from both the corresponding user (e.g., the first party) and the security service or security software protection that is performing method 300 to protect the user's privacy (e.g., the second party). Generally speaking, the third-party script may correspond to a privacy-attacking script that attempts to undermine or diminish the privacy of the user.

Detection module 104 may perform step 304 in a variety of ways. In some examples, detection module 104 may detect whether the third-party script has access to the user account identifier at least in part through an extension of a browser, such as extension 230, detecting that the third-party script has access to the user account identifier through the browser. In other words, in these examples both the website content and the third-party script, such as a JavaScript component, may be stored within and/or executed within the same browser. Accordingly, in these examples, the third-party script executing within the browser may have access through the browser to content of the website, as discussed further below.

In some examples, detecting whether the third-party script has access to the user account identifier may include dividing the website into different contexts. As illustrative examples, one context may correspond to <iframe> and another context may correspond to <frameset>. Generally speaking, detection module 104 may divide the website into different contexts, which may include different portions or frames of the website. In these examples, detection module 104 may further check where information indicating the user account identifier is located within the website. Detection module 104 may also detect what data is available to which third-party script (e.g., due to the fact that multiple third-party scripts may be present or executing). Once detection module 104 has retrieved one or more of these items of information, detection module 104 may further check whether one or more of the third-party scripts is actually willing to, or programmed to, read content of the website. For example, detection module 104 may hook a script or JavaScript function such as "node.textContent" or "textObject.value." As further shown in FIG. 4, third-party script 124 may optionally include a code item 408, which includes the function identifier "node.textContent". Similarly, third-party script 124 may optionally include a code item 410, which includes the function identifier "textObject.value".

Additionally, detection module 104 may also categorize a purpose of the third-party script that is referenced at step 304. In some examples, detection module 104 may categorize the purpose of each one of a set of multiple third-party scripts, regardless of whether the third-party scripts are programmed to read website content, as discussed above. Alternatively, in further examples detection module 104 may only perform the categorizing procedure to categorize third-party scripts that have been detected as programmed to read website content. Categorizing the purpose of the third-party script may enable detection module 104 and performance module 106 to inform a corresponding user about potential consequences of the presented privacy problem. Detection module 104 may primarily categorize the third-party script into one or more of the following four main categories. A first category may include scripts that create identifier cookies. A second category may include scripts that generate browser fingerprints. A third category may include scripts that perform a quick replay function. Lastly, a fourth category may include scripts that are not related to online user tracking. To categorize the purpose of the third-party script, detection module 104 may optionally hook one or more, or all, of a set of different functions that have previously been identified as used for purposes corresponding to one or more of categories 1-3. These functions may include functions such as "canvas.toDataURL" and "document.cookie." As further shown in FIG. 4, third-party script 124 may also include a code item 412, which includes a function identifier "canvas.toDataURL" that may be used for browser fingerprinting. Similarly, third-party script 124 may also include a code item 414, which includes a function identifier "document.cookie" and this identifier thereby further indicates that third-party script 124 is directed to at least one of categories 1-3.

At step 306, one or more of the systems described herein may perform, based at least in part on detecting that the third-party script has access to the user account identifier, a security action to protect user privacy such that the security action facilitates an attempt to prevent the third-party script from actually accessing the user account identifier. For example, performance module 106 may, as part of computing device 202 in FIG. 2, perform, based at least in part on detecting that third-party script 124 has access to the user account identifier, a security action to protect user privacy such that the security action facilitates an attempt to prevent third-party script 124 from actually accessing the user account identifier.

Performance module 106 may perform the security action in a variety of ways. A first illustrative example of the security action may include simply informing a corresponding user about the privacy problem or vulnerability that was detected according to steps 302-304. An additional optional example of the security action may include offering for the user to approve the performance of an additional security action, beyond informing the user, to take a concrete action to protect the user's privacy, as discussed further below. A further optional example of the security action may include blocking execution of the third-party script or blocking reception, by the third-party script, of information indicating or containing the user account identifier. Generally speaking, performance module 106 may operate through an extension, such as extension 230, to provide a real-time solution to protect the user immediately upon detecting the privacy problem that is outlined above.

Another illustrative example of the security action may include hiding or obfuscating the user account identifier. Hiding or obfuscating the user account identifier may avoid any type of a privacy attack, and will also prevent certain scripts from accessing corresponding user information. The feature of hiding or obfuscating the user account identifier may be user configurable. For example, performance module 106 may optionally use "initiator" data, which is provided by the browser, and the functions that are already hooked, as discussed above, in order to differentiate between third-party scripts that are directed to tracking or extracting the user account identifier, and those that are not.

The solution outlined above, in terms of hiding or obfuscating the user account identifier, may nevertheless break some website functionality. For example, the website functionality may become broken if the same third-party script offers another type of an additional service. If detection module 104 and/or performance module 106 detect that the website functionality may become broken, as discussed above, then performance module 106 may offer an additional or alternative solution. Performance module 106 may inform the user of the privacy problem that was previously detected. Performance module 106 may also offer the user the possibility of creating a privacy-masking user account identifier, such as a UUID or GUID user account identifier. In the case of an email address, such identifier may be generated using a domain or subdomain that is managed or administered by a security service that provides the software protection that performs method 300. For example, if NortonLifeLock provides the software protection that performs method 300, then in that scenario performance module 106 may optionally offer to the user the opportunity to generate a UUID email address, such as 97f5be43-f901-49d4-a55d-85b33baee934@secure.nortonlifelock.com. If the user accepts the offer to use the generated user account identifier as a substitute, then no third-party will be able to perform any one or more of the privacy-targeting attacks that are described above. Additionally, the user will not lose any functionality of the corresponding website, and the user will still receive all corresponding messages, because the security vendor, such as NortonLifeLock, may redirect one or more of these messages back to the original user account identifier. In these scenarios, the original user account remains operable, but the identifier for that account is effectively masked and protected from leaking to one or more third-party scripts.

The present disclosure is generally directed to systems and methods for protecting user privacy. The disclosed subject matter may improve upon related technology by increasing a degree to which a user is protected from online tracking services that can merge multiple identifiers to indicate a single email or user account identifier. The disclosed subject matter may achieve this improved benefit by detecting when a website has a vulnerability that may potentially release or indicate the user account identifier, detecting whether a script can access the user account identifier, and performing a corresponding security action to protect the user from this detected vulnerability.

Figure 5:
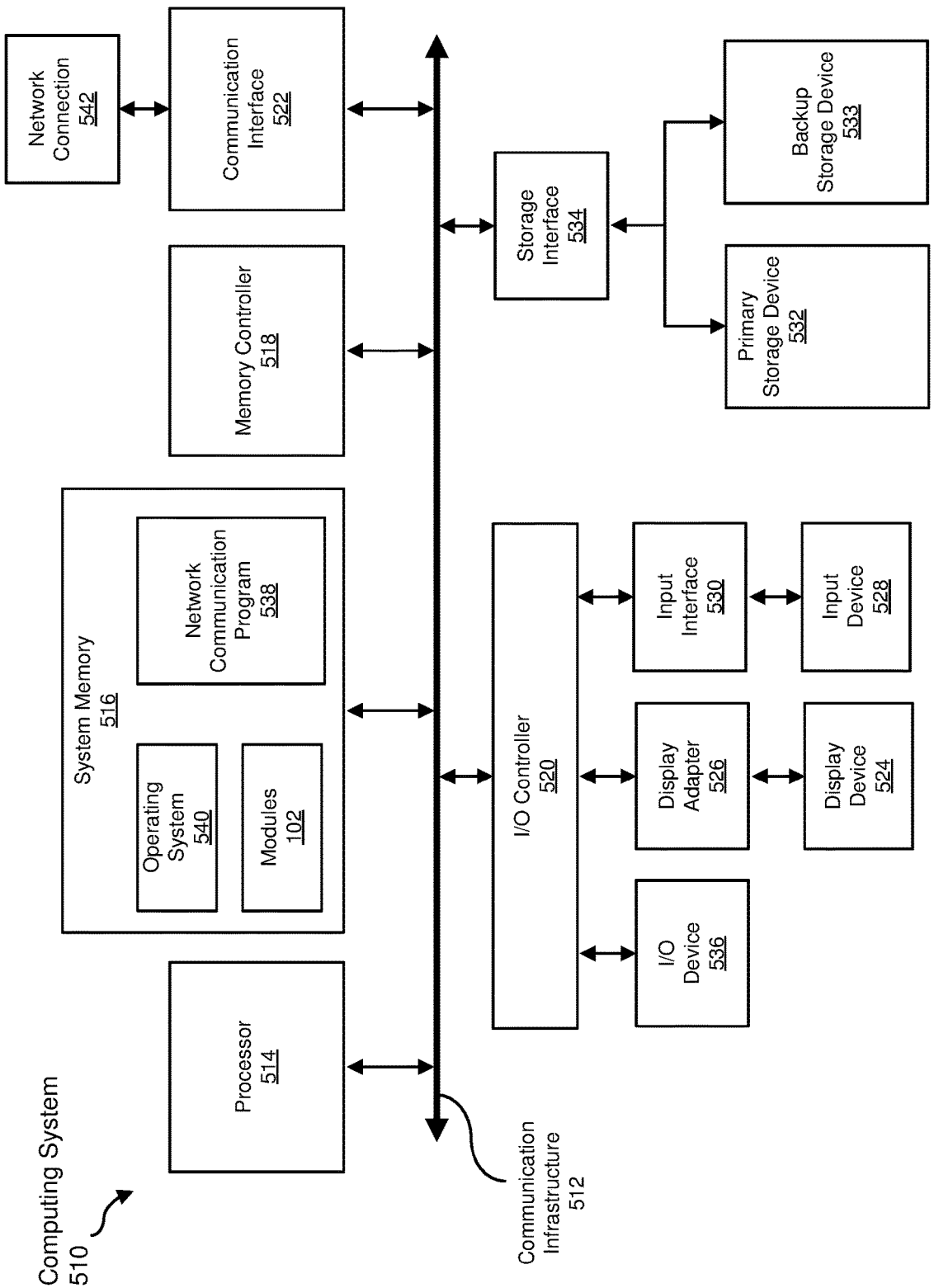
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally, or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
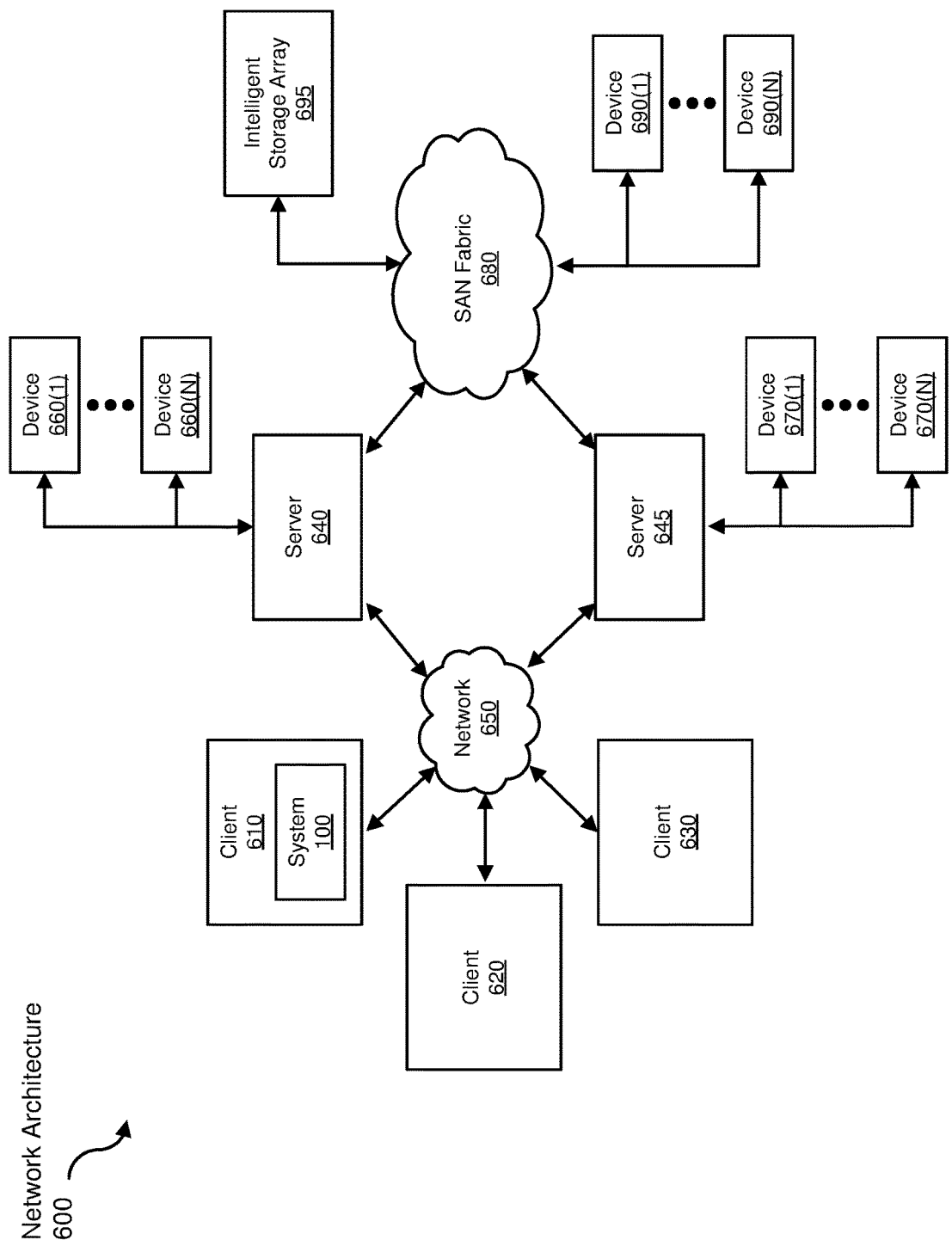
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the present disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for protecting user privacy.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally, or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting user privacy, at least a portion of the method being performed by a computing device comprising at least one processor, the method comprising:
   detecting that a website indicates a user account identifier;
   detecting whether a third-party script has access to the user account identifier; and
   performing, based at least in part on detecting that the third-party script has access to the user account identifier, a security action to protect user privacy such that the security action facilitates an attempt to prevent the third-party script from actually accessing the user account identifier;
   wherein:
   the user account identifier comprises an email address;
   detecting that the website indicates the user account identifier comprises a detection module, as part of a password manager, checking whether email addresses that are stored in the password manager are actually being displayed within the website;

detecting whether the third-party script has access to the user account identifier further comprises hooking a JavaScript function;

performing the security action comprises offering to generate a universally unique identifier email address to use as a substitute for the user account identifier such that a third-party is prevented from performing a privacy-targeting attack; and the security action of offering to generate the universally unique identifier email address is performed as an alternative in response to a determination by the detection module that obfuscating the email address may break functionality of the website.

2. The computer-implemented method of claim 1, wherein the universally unique identifier email address is generated using a domain or subdomain that is managed by a security service that provides software protection that performs the method.

3. The computer-implemented method of claim 2, wherein a user account corresponding to the user account identifier still receives a set of messages because the security service is configured to redirect the set of messages back to the original user account identifier.

4. The computer-implemented method of claim 1, wherein detecting that the website indicates the user account identifier comprises detecting through a login form that the website requests the user account identifier.

5. The computer-implemented method of claim 1, wherein detecting that the website indicates the user account identifier comprises detecting that the user account identifier is embedded in text of the website after a user logon procedure has succeeded.

6. The computer-implemented method of claim 1, wherein detecting whether the third-party script has access to the user account identifier comprises dividing the website into different contexts.

7. The computer-implemented method of claim 1, wherein detecting whether the third-party script has access to the user account identifier comprises checking whether the third-party script contains code that, when executed, reads website content.

8. The computer-implemented method of claim 1, further comprising categorizing a purpose of the third-party script.

9. The computer-implemented method of claim 8, wherein categorizing the purpose of the third-party script comprises categorizing the third-party script into at least one of the following categories:
scripts that create identifier cookies;
scripts that generate browser fingerprints;
scripts that perform click replay functions; or
scripts that are not related to online user tracking.

10. The computer-implemented method of claim 1, wherein the security action comprises at least one of:
hiding or obfuscating the user account identifier; or
substituting the user account identifier with a privacy-masking user account identifier.

11. A system for protecting user privacy, the system comprising:
a detection module, stored in memory, that:
detects that a website indicates a user account identifier; and
detects whether a third-party script has access to the user account identifier;
a performance module, stored in memory, that performs, based at least in part on detecting that the third-party script has access to the user account identifier, a security action to protect user privacy such that the security action facilitates an attempt to prevent the third-party script from actually accessing the user account identifier; and
at least one physical processor configured to execute the detection module and the performance module;
wherein:
the user account identifier comprises an email address;
the detection module is configured to detect that the website indicates the user account identifier at least in part by the detection module, as part of a password manager, checking whether email addresses that are stored in the password manager are actually being displayed within the website;
detecting whether the third-party script has access to the user account identifier further comprises hooking a JavaScript function;
the performance module is configured to perform the security action at least in part by offering to generate a universally unique identifier email address to use as a substitute for the user account identifier such that a third-party is prevented from performing a privacy-targeting attack; and
the performance module is configured to perform the security action of offering to generate the universally unique identifier email address as an alternative in response to a determination by the detection module that obfuscating the email address may break functionality of the website.

12. The system of claim 11, wherein the detection module detects whether the third-party script has access to the user account identifier comprises an extension of a browser detecting that the third-party script has access to the user account identifier through the browser.

13. The system of claim 11, wherein the user account identifier comprises at least one of:
an email address; or
a social networking user account identifier.

14. The system of claim 11, wherein the detection module detects that the website indicates the user account identifier by detecting through a login form that the website requests the user account identifier.

15. The system of claim 11, wherein the detection module detects that the website indicates the user account identifier by detecting that the user account identifier is embedded in text of the website after a user logon procedure has succeeded.

16. The system of claim 11, wherein the detection module detects whether the third-party script has access to the user account identifier by dividing the website into different contexts.

17. The system of claim 11, wherein the detection module detects whether the third-party script has access to the user account identifier by checking whether the third-party script contains code that, when executed, reads website content.

18. The system of claim 11, wherein the performance module further categorizes a purpose of the third-party script.

19. The system of claim 18, wherein the performance module categorizes the purpose of the third-party script by categorizing the third-party script into at least one of the following categories:
scripts that create identifier cookies;
scripts that generate browser fingerprints;
scripts that perform click replay functions; or
scripts that are not related to online user tracking.

20. A non-transitory computer-readable medium comprising one or more computer-readable instructions that, when executed by at least one processor of a computing device, cause the computing device to:
- detect that a website indicates a user account identifier;
- detect whether a third-party script has access to the user account identifier; and
- perform, based at least in part on detecting that the third-party script has access to the user account identifier, a security action to protect user privacy such that the security action facilitates an attempt to prevent the third-party script from actually accessing the user account identifier;

wherein:
- the user account identifier comprises an email address;
- detecting that the website indicates the user account identifier comprises a detection module, as part of a password manager, checking whether email addresses that are stored in the password manager are actually being displayed within the website;
- detecting whether the third-party script has access to the user account identifier further comprises hooking a JavaScript function;
- performing the security action comprises offering to generate a universally unique identifier email address to use as a substitute for the user account identifier such that a third-party is prevented from performing a privacy-targeting attack; and
- the security action of offering to generate the universally unique identifier email address is performed as an alternative in response to a determination by the detection module that obfuscating the email address may break functionality of the website.

* * * * *